United States Patent
Holland et al.

(10) Patent No.: US 9,412,147 B2
(45) Date of Patent: Aug. 9, 2016

(54) DISPLAY PIPE LINE BUFFER SHARING

(71) Applicant: Apple Inc., Cupertino, CA (US)

(72) Inventors: Peter F. Holland, Los Gatos, CA (US);
Hari Ganesh R. Thirunageswaram, Milpitas, CA (US); Jeffrey J. Irwin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 14/493,755

(22) Filed: Sep. 23, 2014

(65) Prior Publication Data

US 2016/0086298 A1    Mar. 24, 2016

(51) Int. Cl.
*G06T 1/20*    (2006.01)
*G06T 1/60*    (2006.01)

(52) U.S. Cl.
CPC ... *G06T 1/20* (2013.01); *G06T 1/60* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 8,314,803 B2 | 11/2012 | Bergland et al. | |
| 8,314,806 B2 * | 11/2012 | Samson | G06F 3/14 345/531 |
| 8,364,999 B1 * | 1/2013 | Adessa | G06F 1/3203 713/323 |
| 8,736,627 B2 | 5/2014 | Brothers | |
| 2007/0094444 A1 | 4/2007 | Sutardja | |
| 2013/0194286 A1 | 8/2013 | Bourd et al. | |
| 2014/0089604 A1 | 3/2014 | Holland et al. | |

* cited by examiner

*Primary Examiner* — Edward Martello
(74) *Attorney, Agent, or Firm* — Meyertons, Hood, Kivlin, Kowert & Goetzel, P.C.

(57) ABSTRACT

An apparatus for processing graphics data may include a plurality of processing pipelines, each pipeline configured to receive and process pixel data. A functional unit may combine the outputs of each processing pipeline. A buffer included in a given processing pipeline may be configured to store data from the functional unit in response to a determination that the given processing pipeline is inactive. The buffer may then send the stored data to a memory.

17 Claims, 7 Drawing Sheets

DISPLAY PIPE LINE BUFFER SHARING

BACKGROUND

1. Technical Field

This disclosure relates generally to processing video input for display, and more specifically to methods for sharing hardware resources between different display pipelines.

2. Description of the Related Art

Part of the operation of many computer systems, including portable digital devices such as mobile phones, notebook computers and the like, is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel." For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. To represent a specific color on an electronic display, each pixel may have three values, one each for the amounts of red, green, and blue present in the desired color. Some formats for electronic displays may also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr).

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically consists of a specified number of pixels according to the resolution of the image/video frame. Most graphics systems use frame buffers to store the pixels for image and video frame information. The term "frame buffer" often denotes the actual memory used to hold picture/video frames. The information in a frame buffer typically consists of color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The total amount of the memory required for frame buffers to store image/video information depends on the resolution of the output signal, and on the color depth and palette size. The High-Definition Television (HDTV) format, for example, is composed of up to 1080 rows of 1920 pixels per row, or almost 2.1M pixels per frame.

Various display formats are in common use today for computing devices to connect to electronic displays, including, but not limited to, older standards such as VGA and DVI, and more modern standards such as HDMI and DisplayPort. In addition, new standards are being developed such as, for example, HDBaseT. These various formats have various data resolution requirements, resulting in some formats using more data bits per pixel than others. In order to provide a high quality picture to all formats, an apparatus as discussed above may process all graphical data with enough data bits for the supported display format requiring the highest resolution. This leaves the apparatus responsible for removing data bits in order to support the other formats, which use lower resolutions.

SUMMARY OF EMBODIMENTS

Various embodiments of methods and devices for processing pixel data are disclosed. Broadly speaking an apparatus and method are contemplated in which the apparatus includes a plurality of processing pipelines, each of which may be configured to process received pixel data and generate respective formatted data. A functional unit may combine the formatted data from each processing pipeline to generate display data. A first buffer included in a first processing pipeline of the plurality of processing pipelines may be configured to receive and store the display data in response to a determination that the first processing pipeline is inactive. The first buffer may be further configured to send the stored display data to a memory.

In another embodiment, circuitry may be configured to disable a first clock signal coupled to at least one processing pipeline of the plurality of processing pipelines. The circuitry may disabled the first clock in response to a determination that an amount of data stored in the first buffer is greater than or equal to a first buffer threshold value, and that an amount of data stored in the memory is greater than or equal to a first memory threshold value.

In other embodiments, the circuitry may be further configured to enable a second clock signal coupled to the first buffer. The circuitry may enable the second clock signal in response to a determination that the amount of data stored in the memory is less than a second memory threshold value.

Figure 1:
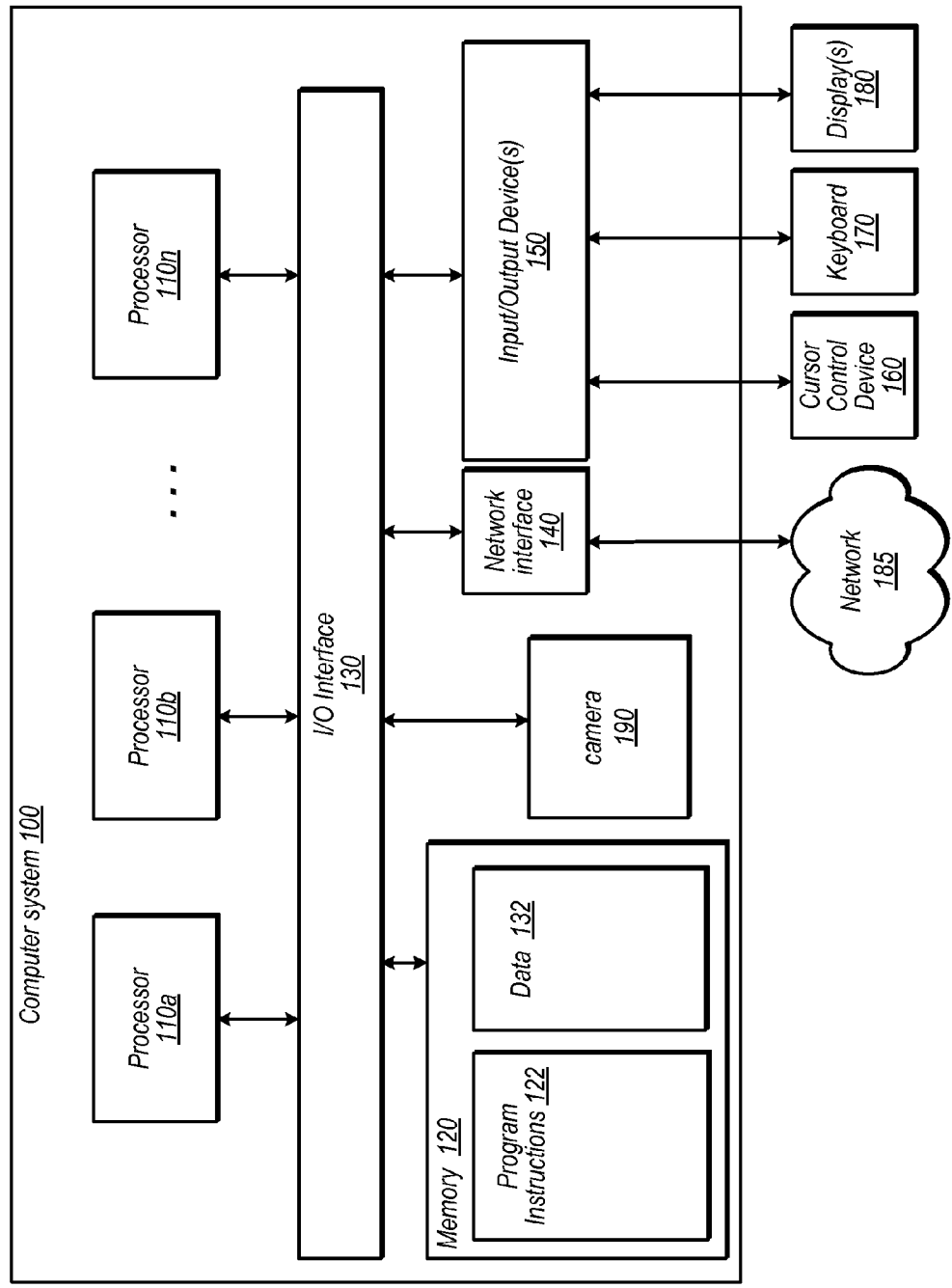
FIG. 1 illustrates a block diagram of an embodiment of a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Typically, raw video is received by an apparatus (e.g., an integrated circuit (IC), such as a system-on-a-chip (SOC), or a package such as a multi-chip module (MCM)) of a computer system in a format that is not directly compatible with the electronic display to which a display controller of the apparatus outputs frames to be displayed. In addition, the display controller may not accept the raw video format as input. Thus, at least some processing of input video may be performed by the apparatus to convert the video input into a display-compatible format before outputting the video frames to the electronic display for viewing. For example, the apparatus may be used to convert the video input from a raw video format (e.g., YUV420/1080p) to electronic display (e.g., ARGB) format frames of an appropriate size for viewing prior to feeding the video frames to the display controller. The display controller may perform additional rendering of the frames prior to feeding the frames to the electronic display.

In addition, there may be other graphical content, for example user interface graphics or objects, that may be input to the apparatus for processing and displaying to the electronic display. One or more video input streams and one or more of these other graphical input sources may be input for display concurrently. For example, a user may be watching a video on the computer system, and the operating system (OS) of the computer system or an application on the device may, during the video generate a notification or other user interface element that needs to be presented on the electronic display. Thus, in addition to video processing, another function that may be performed by the apparatus is combining these different graphical inputs such as, e.g., a video stream and one or more Graphical User-Interface (GUI) elements, into output frames to be presented on the electronic display simultaneously. This function may be referred to as window compositing.

During the processing of a frame of data, only portions of a display processor may be active. For example, only one generic pipeline may be used to downscale a user interface frame for display. Alternatively, a single generic pipeline may be operating in a no-scale mode to display a frame. In such cases, other generic pipelines may be active. While the other generic pipelines may be clock gated (i.e., a clock signal coupled to the pipeline may be stopped) to save dynamic power, the other generic pipelines may not be power gated which may be an inefficient use of power resources. The embodiments illustrated in the drawings and described below may provide techniques for using hardware resources of inactive generic pipelines to increase the effective capacity of storage circuits within the active portion of the display processor to improve power efficiency.

A block diagram of an embodiment of a computing system is illustrated in FIG. 1. In different embodiments, computer system 100 may be any of various types of devices, including, but not limited to, a desktop computer, laptop, tablet or pad device, mainframe computer system, workstation, a camera, a set top box, a mobile device, a mobile phone, a consumer device, video game console, handheld video game device, or any general type of computing or electronic device.

In the illustrated embodiment, computer system 100 includes one or more processors 110 coupled to system memory 120 via input/output (I/O) interface 130. Computer system 100 further includes network interface 140 coupled to I/O interface 130, and one or more input/output devices 150, such as cursor control device 160, keyboard 170, and display(s) 180. Computer system 100 may also include one or more cameras 190, which may also be coupled to I/O interface 130. At least one of cameras 190 may be operable to capture video sequences.

Although computer system 100 depicts a multiple processors (commonly referred to as a "multiprocessor system"), in other embodiments, a single processor may be employed. Processors 110 may be any suitable processor capable of executing instructions. For example, in various embodiments processors 110 may be general-purpose or embedded processors implementing any of a variety of Instruction Set Architectures (ISAs), such as the x86, PowerPC, SPARC, or MIPS ISAs, or any other suitable ISA. In multiprocessor systems, each of processors 110 may commonly, but not necessarily, implement the same ISA.

System memory 120 may be configured to store program instructions 122 and/or data 132 accessible by processor 110. In various embodiments, system memory 120 may be implemented using a variety of memory technologies, such as, e.g., Static Random Access Memory (SRAM), Synchronous Dynamic Random Access Memory (SDRAM), non-volatile memory, or any other suitable type of memory. In the illustrated embodiment, program instructions 122 may be configured to implement various interfaces, methods and/or data, such, e.g., drivers, for controlling operations of an apparatus implementing embodiments of multiple video processing modes and embodiments of image compression techniques. Although only a single memory is illustrated in computing system 100, in some embodiments, different numbers and different configurations of memories may be employed.

In one embodiment, I/O interface 130 may be configured to coordinate I/O traffic between processor 110, system memory 120, and any peripheral devices in the device, including network interface 140 or other peripheral interfaces, such as input/output devices 150. In some embodiments, I/O interface 130 may perform any necessary protocol, timing or other data transformations to convert data signals from one component such as, e.g., system memory 120, into a format suitable for use by another component such as, processor 110, for example. In some embodiments, I/O interface 130 may include support for devices attached through various types of peripheral buses, such as a variant of the Peripheral Component Interconnect (PCI) bus standard or the Universal Serial Bus (USB) standard, for example. In some embodiments, the function of I/O interface 130 may be split into two or more separate components, such as a north bridge and a south bridge, for example. Also, in some embodiments some or all of the functionality of I/O interface 130, such as an interface to system memory 120, may be incorporated directly into processor 110.

Network interface 140 may be configured to allow data to be exchanged between computer system 100 and other devices attached to a network 185 (e.g., carrier or agent devices) or between nodes of computer system 100. Network 185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 140 may support communication via wired or wireless general data networks, such as, e.g., any suitable type of Ethernet network, via telecommunications/telephony networks such as analog voice networks or digital fiber communications networks; via storage area networks such as Fiber Channel SANs, or via any other suitable type of network and/or protocol.

Input/output devices 150 may, in some embodiments, include one or more display terminals, keyboards, keypads, touchpads, scanning devices, voice or optical recognition devices, or any other devices suitable for entering or accessing data by computer system 100. Multiple input/output devices 150 may be present in computer system 100 or may be distributed on various nodes of computer system 100. In some embodiments, similar input/output devices may be separate from computer system 100 and may interact with one or more nodes of computer system 100 through a wired or wireless connection, such as over network interface 140.

As shown in FIG. 1, system memory 120 may include program instructions 122, which may be processor-executable to implement any element or action to support operations of circuit blocks implementing embodiments of multiple video processing modes and embodiments of image compression techniques. In at least some embodiments, images or video captured by a camera 190 may be stored to system memory 120. In addition, metadata for images or video captured by a camera 190 may be stored to system memory 120. Video streams stored to system memory 120 may, for example, be processed by embodiments of an apparatus implementing embodiments of multiple video processing modes and embodiments of image compression techniques.

It is noted that the embodiment illustrated in FIG. 1 is merely an example. In particular, the computer system and devices may include any combination of hardware or software that can perform the indicated functions, including computers, network devices, Internet appliances, PDAs, wireless phones, pagers, video or still cameras, etc. Computer system 100 may also be connected to other devices that are not illustrated, or instead may operate as a stand-alone system. In addition, the functionality provided by the illustrated components may, in some embodiments, be combined in fewer components or distributed in additional components. Similarly, in other embodiments, the functionality of some of the illustrated components may not be provided and/or other additional functionality may be available.

It is further noted that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 100 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 100 may be transmitted to computer system 100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM (Read-Only Memory), volatile or non-volatile media such as Random Access Memory (RAM), such as, e.g., Synchronous Dynamic RAM (SDRAM), Double Data Rate SDRAM (DDR), Static RAM (SRAM), etc.), ROM, flash, etc. In some embodiments, a computer-accessible medium may include transmission media or signals such as electrical, electromagnetic, or digital signals, conveyed via a communication medium such as network and/or a wireless link.

Figure 2:
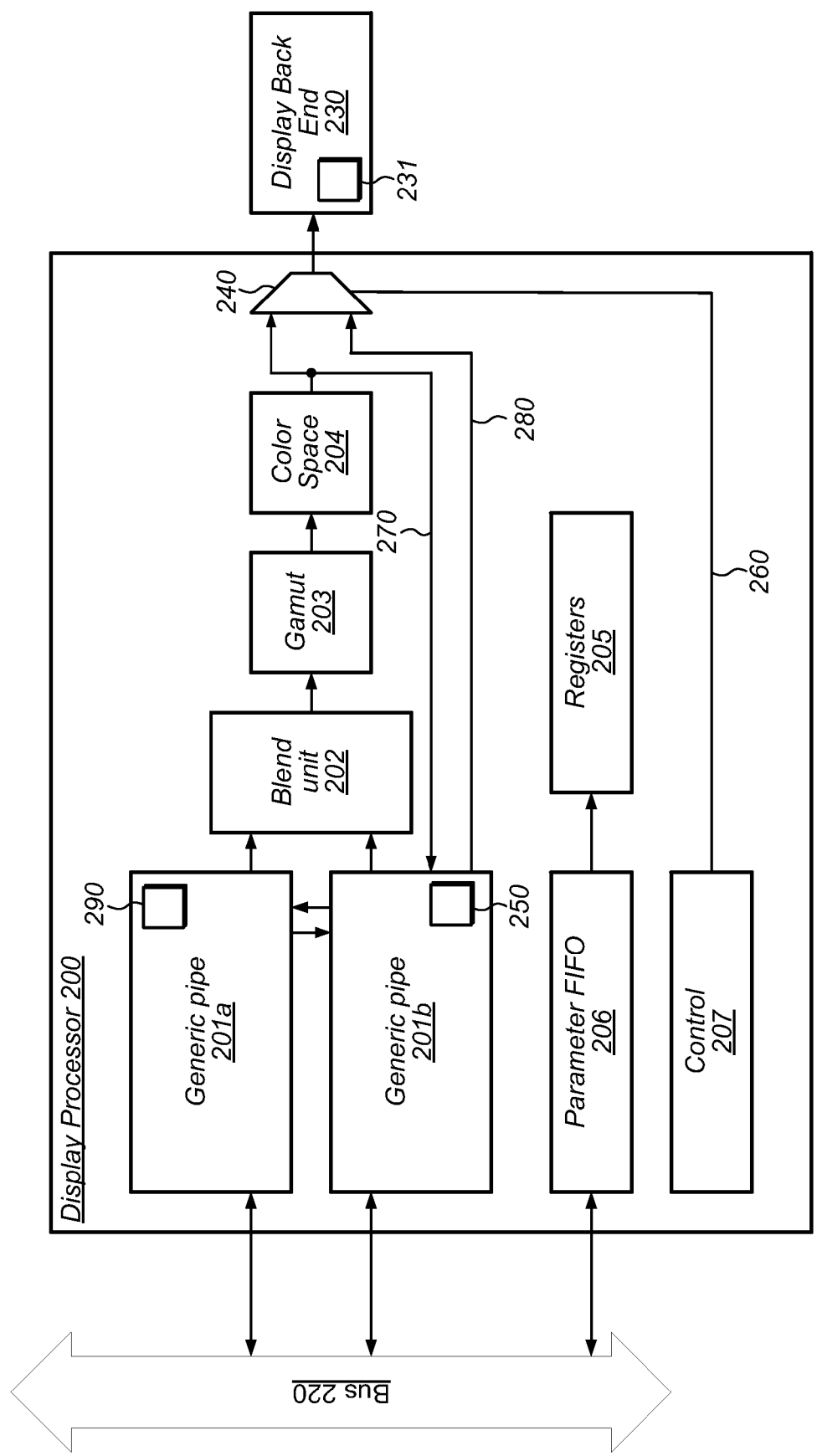
FIG. 2 illustrates a block diagram of an embodiment of a display processor.

Turning to FIG. 2, an embodiment of a display processor is illustrated. In the illustrated embodiment, display processor 200 may be coupled to a system bus 220 and to a display back end 230. Display processor 200 may include functional sub-blocks such as one or more generic pipelines (also referred to herein as "processing pipelines" or "processing pipes") 201a-b, coupled to system bus 220, blending unit 202, coupled to generic pipelines 201, gamut adjustment block 203, coupled to blending unit 202, color space converter 204, coupled to gamut adjustment block 203, multiplex circuit 240 coupled to generic pipe 210b and coupled to display back end 230. Display processor 200 may also include control registers 205, coupled to the various sub-blocks in display controller 200, and a parameter First-In First-Out buffer (FIFO) 206, coupled to system bus 220 and control registers 205. Display processor 200 may also include control unit 207.

System bus 220, in some embodiments, may correspond to I/O interface 130 from FIG. 1. System bus 220 couples various functional blocks such that the functional blocks may pass data between one another. Display controller 200 may be coupled to system bus 220 in order to receive video frame data for processing. In some embodiments, display processor 200 may also send processed video frames to other functional blocks and or memory that may also be coupled to system bus 220.

Display back end 230 may receive processed image data as each pixel is processed by display processor 200. Display back end 230 includes FIFO 231, and may provide final processing to the image data before each video frame is displayed. In some embodiments, display back end may include ambient-adaptive pixel (AAP) modification, dynamic backlight control (DPB), display panel gamma correction, and dithering specific to an electronic display coupled to display back end 230.

The display processor 200 may include one or more generic pipelines 201a-b. Each generic pipeline 201 may fetch a video frame from a buffer coupled to system bus 220. The buffered video frame may reside in a system memory such as, for example, system memory 120 from FIG. 1. Each generic pipeline 201 may fetch a distinct image and may process its image in various ways to create formatted data. The processing to create the formatted data may include format conversion, such as, for example, YCbCr to ARGB, image scaling, dithering, and the like. In some embodiments, each generic pipeline may process one pixel at a time, in a specific order from the video frame, outputting a stream of formatted pixel data, maintaining the same order as pixel data passes through.

As described below in more detail, each of generic pipelines 201a-b includes a line buffer. In some embodiments, a line buffer from an inactive generic pipeline may be coupled to a line buffer of an active generic pipeline to increase the effective storage capacity of the line buffer of the active generic pipeline. For example, in cases when generic pipeline 201b is not processing data associated with a particular frame, data to be stored in line buffer 290 of generic pipeline 201a may be stored in either line buffer 290 of line buffer 250. By using line buffer 250 to increase the effective storage capacity of line buffer 290, more than one line of the particular frame may be stored, thereby reducing the frequency of fetch requests sent via bus 220.

Multiplex circuit 240 may be configured to select one of color space converter output 270 or line buffer output 280 in response to control signal 260. In some embodiments, when generic pipe 201b is not being used to process a given frame, line buffer 250 of generic pipe 201b may be used as additional storage in the output path. Color space converter output 270 may be routed to line buffer 250 for storage. Line buffer output 280 may then be selected by multiplex circuit 240 to send to display back end 230. By routing data from the color space converter 204 through line buffer 250, the effective storage capacity of output FIFO 231 may, in various embodiments, be increased. As described below in more detail, line buffer 250 and output FIFO 231 may be coupled to different clock signals, allowing separate clock gating for each of the storage circuits.

Control unit 207 may, in various embodiments, be configured to arbitrate read requests to fetch data from memory from the generic pipeline 201a and generic pipeline 201b. In some embodiments, generic pipeline 201a and generic pipeline 201b may each generate two read requests, resulting in four read requests competing for access to memory. Generic pipelines 201a and 201b may, in other embodiments, assign an initial priority to each of the generated read requests. Control unit 207 may, in some embodiments, assign a priority to each request and dependent upon a display coordinate (where on a display the data to be fetch is to be shown). In various embodiments, control unit 207 may assign priorities to the read requests dependent upon any assigned initial priorities. The assigned priorities may then be used by control unit 207 to determine an order in which requests may be sent via bus 220 to memory. In some embodiments, the read requests may point to a virtual address. A memory management unit (not shown) may convert the virtual address to a physical address in memory prior to the requests being presented to the memory. In some embodiments, control unit 207 may generate control signal 260 to control multiplex circuit 240. Control unit 207 may detect that for a given frame may be processed by a single generic pipe, and an input buffer of an unused generic pipe, such as input buffer 250, may be used as another FIFO in output path (also referred to herein as a "post-blend" FIFO).

In some embodiments, control unit 207 may include a dedicated state machine or sequential logic circuit. A general purpose processor executing program instructions stored in memory may, in other embodiments, be employed to perform the functions of control unit 207.

The output from generic pipelines 201 may be passed on to blending unit 202. Blending unit 202 may receive a pixel stream from one or more generic pipelines. If only one pixel stream is received, blending unit 202 may simply pass the stream through to the next sub-block. However, if more than one pixel stream is received, blending unit 202 may blend the pixel colors together to create an image to be displayed. In various embodiments, blending unit 202 may be used to transition from one image to another or to display a notification window on top of an active application window. For example, a top layer video frame for a notification, such as, for a calendar reminder, may need to appear on top of, i.e., as a primary element in the display, despite a different application, an internet browser window for example. The calendar reminder may comprise some transparent or semi-transparent elements in which the browser window may be at least partially visible, which may require blending unit 202 to adjust the appearance of the browser window based on the color and transparency of the calendar reminder. The output of blending unit 202 may be a single pixel stream composite of the one or more input pixel streams.

The output of blending unit 202 may be sent to gamut adjustment unit 203. Gamut adjustment 203 may adjust the color mapping of the output of blending unit 202 to better match the available color of the intended target display.

The output of gamut adjustment unit 203 may be sent to color space converter 204. Color space converter 204 may take the pixel stream output from gamut adjustment unit 203 and convert it to a new color space. Color space converter 204 may then send the pixel stream to display back end 230 or back onto system bus 220. In other embodiments, the pixel stream may be sent to other target destinations. For example, the pixel stream may be sent to a network interface, such as network interface 140 from FIG. 1, for example. In some embodiments, new color space may be chosen based on the mix of colors after blending and gamut corrections have been applied. In further embodiments, the color space may be changed based on the intended target display.

The parameters that display processor 200 may use to control how the various sub-blocks manipulate the video frame may be stored in control registers 205. These registers may include, but not limited to, setting input and output frame sizes, setting input and output pixel formats, location of the source frames, and destination of the output (display back end 230 or system bus 220). Control registers 205 may be loaded by parameter FIFO 206.

Parameter FIFO 206 may be loaded by a host processor, a direct memory access unit, a graphics processing unit, or any other suitable processor within the computing system. In other embodiments, parameter FIFO 206 may directly fetch values from a system memory, such as, for example, system memory 120 in FIG. 1. Parameter FIFO 206 may be configured to update control registers 205 of display processor 200 before each video frame is fetched. In some embodiments, parameter FIFO may update all control registers 205 for each frame. In other embodiments, parameter FIFO may be configured to update subsets of control registers 205 including all or none for each frame.

A FIFO as used and described herein, may refer to a memory storage buffer in which data stored in the buffer is read in the same order it was written. A FIFO may be comprised of RAM or registers and may utilize pointers to the first and last entries in the FIFO.

It is noted that the display processor illustrated in FIG. 2 is merely an example. In other embodiments, different functional blocks and different configurations of functional blocks may be possible dependent upon the specific application for which the display processor is intended. For example, more than two generic pipelines may be included.

Figure 3:
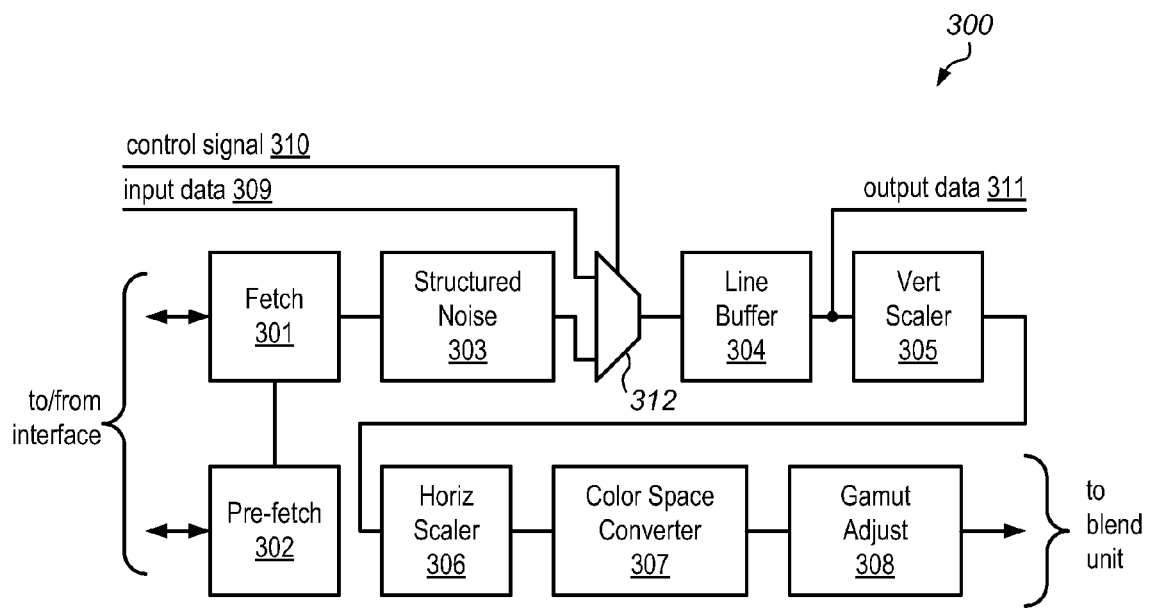
FIG. 3 illustrates an embodiment of a generic processing pipeline.

Turning to FIG. 3, an embodiment of a generic pipeline is illustrated. In some embodiments, generic pipeline 300 may correspond to generic pipelines 201a and 201b of display processor 200 as illustrated in FIG. 2, and may include multiple functional sub-units. In the illustrated embodiment, generic pipeline 300 includes fetch unit 301, pre-fetch unit 302, structure noise unit 303, multiplex circuit 312, line buffer 304, vertical scaler 305, horizontal scaler 306, color space converter 307, and gamut adjust unit 308. In general, generic pipeline 300 may be responsible for fetching pixel data for source frames stored in a memory, and then processing the fetched data before sending the processed data to a blend unit, such as, blend unit 202 of display processor 200 as illustrated in FIG. 2.

Fetch unit 301 and pre-fetch unit 302 may, in some embodiments, be configured to generate read requests for source pixel data needed by generic pipeline 300. In some embodiments, the order in which read request are sent to memory (also referred to as a "source buffer") may be dependent upon a number of source buffer lines needed to generate an output line of a destination frame. Request the source lines, i.e., fetching the source lines from the source buffer, is commonly referred to as a "pass" of the source buffer.

In some embodiments, only data contained in one line of a source buffer may be needed when processing the beginning of a frame. An initial pass of the source buffer may, in various embodiments, include a fetch of as many as nine lines from the source buffer. In other embodiments, subsequent passes through of the source buffer may fetch may require less lines. During each pass of the source buffer, required portions or blocks of data may be fetched from top to bottom, then from left to right, where "top," "bottom," "left," and "right" are in reference to a display.

Each read request may include one or more addresses indicating where the portion of data is stored in memory, i.e., a source buffer. In some embodiments, address information included in the read requests may be directed towards a virtual (also referred to herein as "logical") address space, i.e., an addresses scheme that does not directly point to physical locations within a memory device, but rather is a simplified address space unique to a given processing process, such as, display processing, for example. In such cases, the virtual addresses may be mapped to physical addresses before the read requests are sent to the source buffer. A memory management unit may, in some embodiments, be used to map the virtual addresses to physical addresses. In some embodiments, the memory management unit may be included within the display processor, while in other embodiments, the memory management unit may be located elsewhere within a computing system.

Structured noise unit 303 may, in various embodiments, provide structured noise dithering on the Luma channel of YCbCr formatted data. Other channels, such as, e.g., the chroma channels of YCbCr, and other formats, such as, e.g., ARGB may not be dithered. In various embodiments, structured noise unit 303 may apply a two-dimensional array of Gaussian noise (i.e., statistical noise that is normally distributed) to blocks of the source frame data. A block of source frame data may, in some embodiments, include one or more source pixels. The noise may be applied to raw source data fetched from memory prior to scaling.

Multiplex circuit 312 may be configured to select one of the structured noise unit 303 or input data 309 for input to line buffer 304 responsive to control signal 310. By allowing for two different data sources to be used as input to line buffer 304, the storage capacity of line buffer 304 may be made available to other storage units within a display processor, such as display processor 200, for example. In some embodiments, the storage capacity of line buffer 304 may be used to effectively increase the size of a line buffer in another generic pipeline, function as a standalone FIFO memory, or another suitable use.

Multiplex circuit 312 may be designed in accordance with numerous design styles. For example, multiplex circuit 312 may include one or more pass gates controlled by control signal 310. The output of each pass gate may be coupled together in a wired-OR fashion. It is noted that a pass gate (also referred to as a "transmission gate") may include an n-channel metal-oxide-semiconductor field-effect transistor (MOSFET) and a p-channel MOSFET connected in parallel. In other embodiments, a single n-channel MOSFET or a single p-channel MOSFET may be used as a pass gate. It is further noted that, in various embodiments, a "transistor" may correspond to one or more transconductance elements such as a junction field-effect transistor (JFET), for example.

Line buffer 304 may be configured to store a line of a source frame. The line may include data indicative of luminance and chrominance of individual pixels included within the line. Line buffer 304 may be designed in accordance with one of various design styles. For example, line buffer 304 may be a SRAM, DRAM, or any other suitable memory type. In some embodiments, line buffer 304 may include a single input/output port, while, in other embodiments, line buffer 304 may have multiple data input/output ports. The output of line buffer 304 may be coupled to the input of vertical scaler 305 in addition to output data 311. As described above, by providing for the output of line buffer 304 to exit generic pipeline 300 in conjunction with multiplex circuit 312, the storage capacity of line buffer 304 may be used to increase an effective storage capacity of another storage circuit, or be used as a standalone memory within a display processor.

In some embodiments, scaling of source pixels may be performed in two steps. The first step may perform a vertical scaling, and the second step may perform a horizontal scaling. In the illustrated embodiment, vertical scaler 305 and horizontal scaler 306 may perform the vertical and horizontal scaling, respectively. Vertical scaler 305 and horizontal scaler 306 may be designed according to one of varying design styles. In some embodiments, vertical scaler 305 and horizontal scaler 306 may be implemented as a 9-tap 32-phase filters. Such a multi-phase filter may, in various embodiments, multiply each pixel retrieved by fetch unit 302 by a weighting factor. The results pixel values may then be added, and then rounded to form a scaled pixel. The selection of pixels to be used in the scaling process may be a function of a portion of a scale position value. In some embodiments, the weighting factors may be stored in a programmable table, and the selection of the weighting factors to use in the scaling may be a function of a different portion of the scale position value.

In some embodiments, the scale position value (also referred to herein as the "display position value"), may included multiple portions. For example, the scale position value may include an integer portion and a fractional portion.

In some embodiments, the determination of which pixels to scale may depend on the integer portion of the scale position value, and the selecting of weighting factors may depend on the fractional portion of the scale position value. A Digital Differential Analyzer, as described below in more detail in regards to FIG. 4, may, in various embodiments, be used to determine the scale position value.

Color management within generic pipeline 300 may be performed by color space converter 307 and gamut adjust unit 308. In some embodiments, color space converter 307 may be configured YCbCr source data to the RGB format. Alternatively, color space converter may be configured to remove offsets from source data in the RGB format. Color space converter 307 may, in various embodiments, include a variety of functional blocks, such as, e.g., an input offset unit, a matrix multiplier, and an output offset unit (all not shown). The use of such blocks may allow the conversion from YCbCr format to RGB format and vice-versa.

Gamut adjust unit 308 may, in various embodiments, be configured to convert pixels from a non-linear color space to a linear color space, and vice-versa. In some embodiments, gamut adjust unit 308 may include a Look Up Table (LUT) and an interpolation unit. The LUT may, in some embodiments, be programmable and be designed according to one of various design styles. For example, the LUT may include a SRAM or DRAM, or any other suitable memory circuit. In some embodiments, multiple LUTs may be employed. For example, separate LUTs may be used for Gamma and De-Gamma calculations.

It is noted that the embodiment illustrated in FIG. 3 is merely an example. In other embodiments, different functional blocks and different configurations of functional blocks are possible and contemplated.

Figure 4:
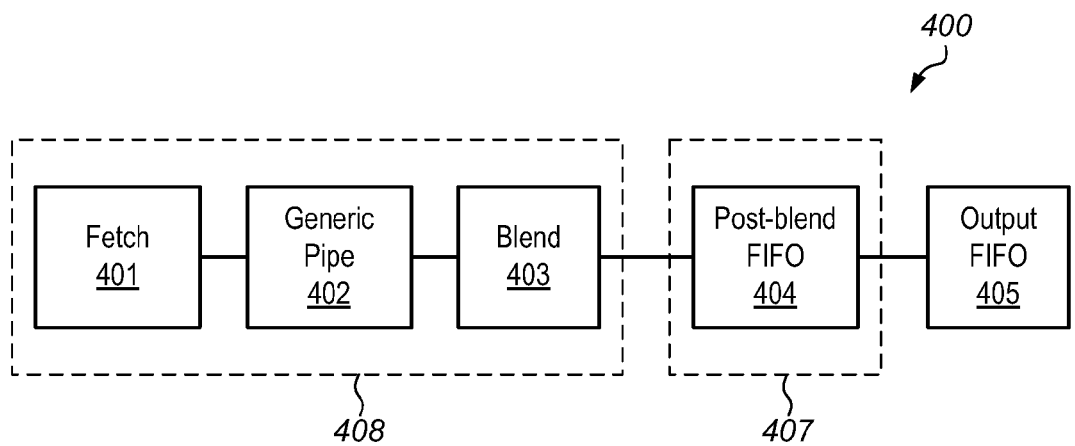
FIG. 4 illustrates a block diagram of an embodiment of clock domains within a display processor.

A block diagram illustrating clock domains in a display processor is depicted in FIG. 4. The illustrated embodiment includes fetch unit 401, generic pipe 402, blend unit 403, post-blend FIFO 404, and output FIFO 405. In various embodiments, fetch unit 401 may correspond to fetch unit 301 and pre-fetch unit 302 as illustrated in FIG. 3, and generic pipe 402 may correspond to the remaining blocks of generic pipeline 300 as illustrated in FIG. 3. Each of fetch unit 401, generic pipe 402, and blend unit 403 is included in clock domain 408, while post-blend FIFO 404 may be included in clock domain 407. Output FIFO 405 may in a third (not shown) clock domain. Functional units within a given clock domain, such as, e.g., clock domain 408, may be coupled to a common clock that may be disabled (also referred to herein as "gated") to reduce power consumption. In various embodiments, a clock signal included each of clock domains 407 and 408 may transition at different frequencies, while, in other embodiments, the clock signals in the different clock domains may transition at the same frequency.

Post-blend FIFO 404 may, in some embodiments, correspond to a line buffer included in an inactive generic pipeline, such as, line buffer 250 of FIG. 2, for example. In various embodiments, output FIFO 405 may correspond to a display back end FIFO, such as, e.g., output FIFO 231.

During operation, clock domains 408 and 407 are both active and clock gating may not be enabled in either domain. As frame data is fetched by fetch unit 401, and processed by generic pipe 402 and blend unit 403, processed data flows through post-blend FIFO 404 and is stored in output FIFO 405. As output FIFO 405 fills with data, processed data will also be stored in post-blend FIFO 404.

When an amount of data stored in output FIFO 405 is greater than a high memory threshold, and an amount of data stored in post-blend FIFO 404 is greater than a high buffer threshold, clock gating may be enabled in both clock domain 407 and clock domain 408, thereby allowing power to be conserved in the functional units included in those clock domains. While clock gating is enabled in both clock domains 407 and 408, data is still being removed from output FIFO 405.

When an amount of data stored in output FIFO 405 falls below a predetermined threshold value, clock gating may be disabled in clock domain 407. With clock gating disabled in clock domain 407, post-blend FIFO 404 may operate continuously, i.e., without inactive periods due to clock gating, sending data to output FIFO 405.

When an amount of data stored in post-blend FIFO 404 falls below another predetermined threshold value, clock gating may then be disabled for clock domain 407, allowing fetch unit 401, generic pipe 402, and blend unit 403 to operate without interruption. With the aforementioned units running, the aforementioned operations will repeat until both output FIFO 405 and post-blend FIFO 404 are both full, at which point, clock gating will be enabled for clock domains 407 and 408. The procedure may then repeat until a complete frame has been processed. Once the complete frame has been processed, the line buffer being used as post-blend FIFO 404 may be re-mapped to be included in its corresponding generic pipeline.

It is noted that the embodiment illustrated in FIG. 4 is merely an example. In other embodiments, different numbers of clocks domains, with different numbers number of functional units within each of the clock domains may be employed.

Figure 5:
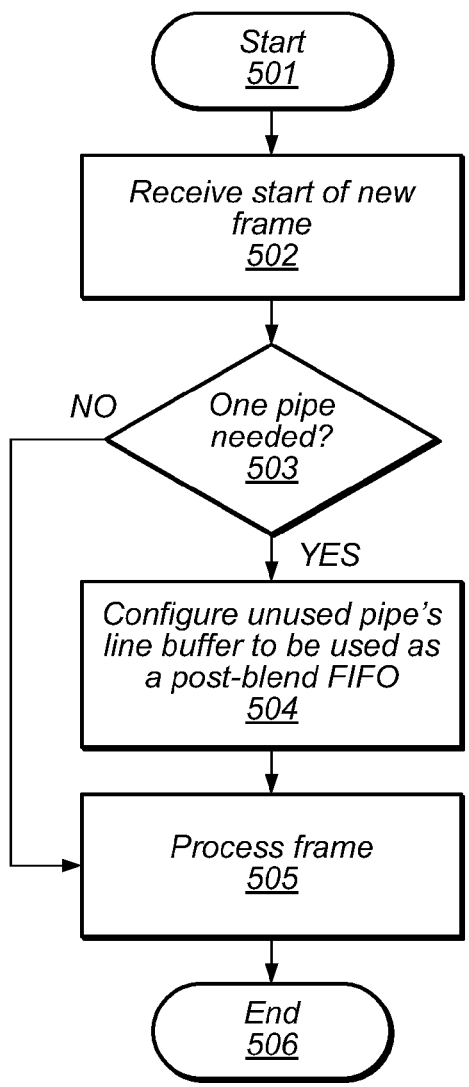
FIG. 5 illustrates a flow diagram depicting an embodiment of a method for operating display processor.

Turning to FIG. 5, a flow diagram depicting a method for operating a display processor, such as, e.g., display processor 200, is illustrated. The method begins in block 501. Pixel data for a new frame may then be received (block 702). In various embodiments, the display processor may send a request for data via a communication bus, such as, bus 220, for example. In response to the request, a memory, such as, e.g., memory 120, may send the pixel data to the display processor via the same communication bus.

The method may then depend on a number of generic pipelines to be used in processing the frame data (block 503). If more than one generic pipeline is required to process the frame data, then the method may conclude in block 506.

If only a single generic pipeline is to be used in processing the frame data, then line buffers from unused generic pipelines may then be used to increase an effective size of an output buffer (block 504). In some embodiments, a multiplex circuit, such as, e.g., multiplex circuit 312 may route data from outside of an inactive generic pipeline to the input of a line buffer of the inactive generic pipeline. For example, the output of color space converter 204 may be sent to the input of line buffer 250 of generic pipe 201b of display processor 200 as illustrated in FIG. 2.

The output from the line buffer of an inactive generic pipeline may be routed to an output of a display processor. A multiplex circuit, such as, e.g., multiplex circuit 240 may then select, depending on an operating mode, between the output of a functional unit, such as, e.g., color space converter 204, and the line buffer of the inactive generic pipeline (e.g., line buffer 250). When the output of the line buffer of the inactive generic pipeline is selected for output from the display processor, the line buffer provides additional storage capacity for an output FIFO in a display back end unit, such as, display back end 230, for example.

As described above in more detail in regard to FIG. 4, the line buffer of the inactive generic pipeline may be included in a different clock domain than the output FIFO of the display back end or the active generic pipeline. By including each of the aforementioned entities in different clock domains, the active generic pipeline may be clock gated while data is transferred from the line buffer to the output FIFO. With the active generic pipeline clock gated, request and response traffic on a communication bus, such as, bus 220, may be reduced, thereby reducing system power consumption.

It is noted that the used of an input buffer of an inactive generic pipeline may be dependent on an operating mode of a display processor. In some embodiments, the line buffer of an inactive generic pipeline may be used during a downscaling mode.

Once the multiplex circuits have been set to allow for the use of the line buffer of an inactive generic pipeline at the output of the display processor, the frame data may then be processed (block 505). In some embodiments, processing the frame data may include color space conversion, gamut adjust, and the like. The method may then conclude in block 506. The control signals operating multiplex circuits, such as, e.g., multiple circuit 240, that allow the use of the line buffer of an inactive generic pipeline external to the inactive generic pipeline may be reset following completion of processing the current frame, thereby allowing the inactive generic pipeline to be used in processing a subsequent frame.

It is noted that the embodiment illustrated in FIG. 5 is merely an example. In other embodiments, different operations and different orders of operations are possible and contemplated.

Figure 6:
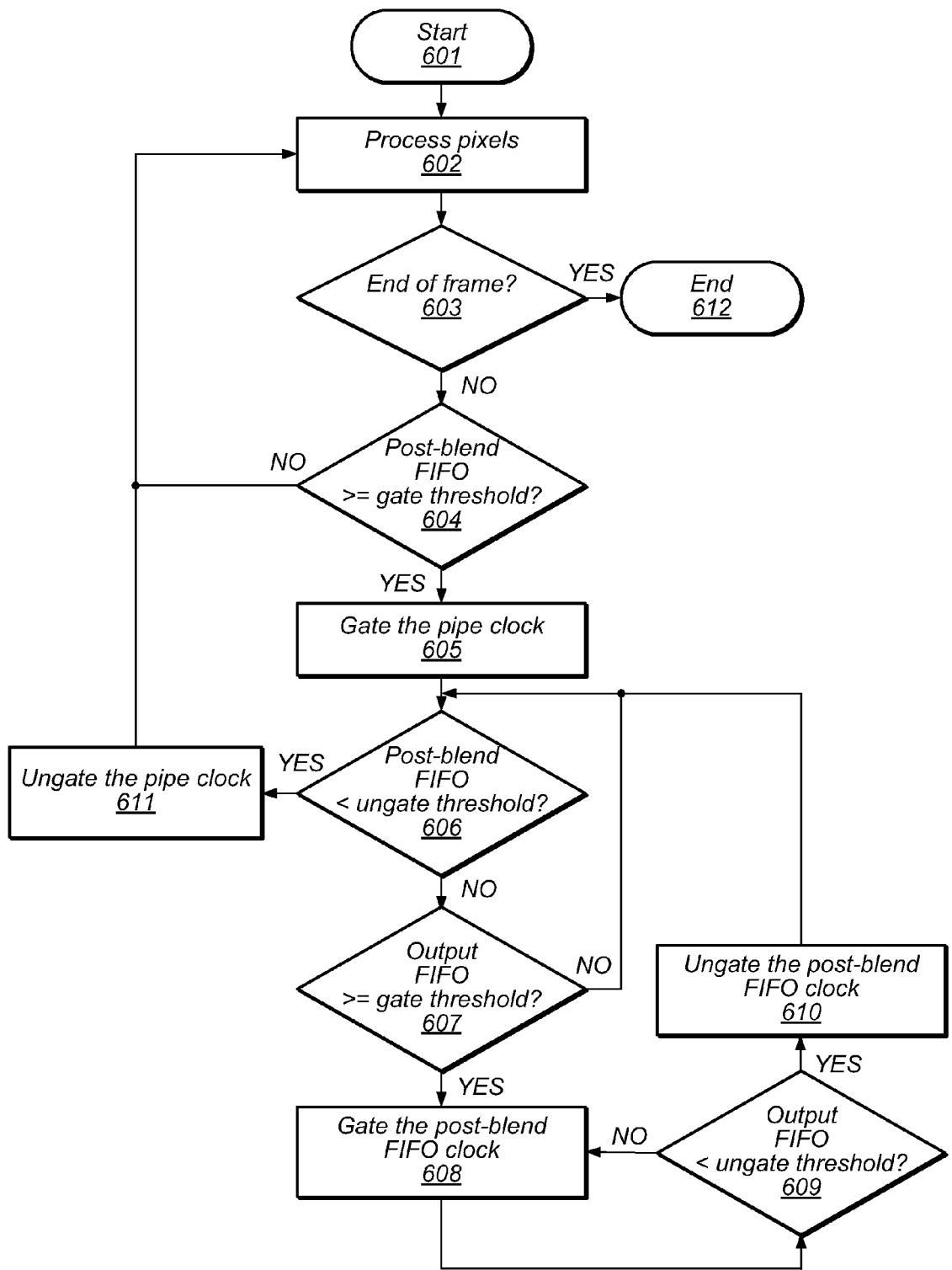
FIG. 6 illustrates a flow diagram depicting an embodiment of a method for performing clock gating within a display processor.

An embodiment of a method for performing clock gating is illustrated in the flow diagram depicted in FIG. 6. Referring collectively to the block diagram of FIG. 4 and the flow diagram of FIG. 6, the method begins in block 601. Received pixel data may then be processed (block 602). In various embodiments, the processing performed may include scaling, color correction, color conversion, and the like. The method may then depend on if the end of a frame has been reached (block 603). Once the end of the frame has been reached, the method may conclude in block 612.

If, however, there are still lines of the frame left to process, the method may then depend on if an amount of data stored in post-blend FIFO 404 is greater than or equal to a gate threshold (block 604). The amount of data stored in post-blend FIFO 404 may be determined in various ways. For example, in some embodiments, a counter may be incremented responsive to a write to the FIFO and decremented responsive to a read from the FIFO. The gate threshold may, in some embodiments, be a predetermined value, while, in other embodiments, the gate threshold may be programmable or under other software control.

If the amount of data stored in post-blend FIFO 404 is less than the gate threshold, then the method may proceed from block 602 as described above. If, however, the amount of data stored in post-blend FIFO 404 is greater than or equal the gate threshold, then clock gating for clock domain 408 may be enabled. In various embodiments, a clock signal coupled to each of fetch unit 401, generic pipe 402, and blend unit 403 may be selective disabled (i.e., "gated"). The gating of the aforementioned clock signal may, in some embodiments, depend upon work load, power consumption, or any other suitable metric.

The method may then depend upon if the amount of data stored in the post-blend FIFO is less than a ungate threshold (block 606). The ungate threshold may, in some embodiments, be a predetermined value, while, in other embodiments, the ungate threshold may be programmable or be under software control. If the amount of data stored in post-blend FIFO is greater than or equal to the ungate threshold, then clock gating for clock domain 408 may be disable (block 611). In various embodiments, the clock signal coupled to each of fetch unit 401, generic pipe 402, and blend unit 403, may be allowed to run without interruption (i.e., "ungated"). Once clock gating for clock domain 408 has been disabled, then method may continue from block 602 as described above.

If the amount of data stored in post-blend FIFO is less than the ungate threshold, then the method may depend on if an amount of data stored in output FIFO 405 is greater than or equal to another gate threshold (block 607). The amount of data stored in output FIFO 607 may, in various embodiments, be determined using a counter or any other suitable method. If the amount of data stored in output FIFO 405 is less than the another gate threshold, then the method may proceed from block 606 as described above. It is noted that the another gate threshold may be programmable, in various embodiments.

If, however, the amount of data stored in output FIFO 405 is greater than or equal to the another gate threshold, the clock gating may be enabled for clock domain 407 (block 608). In various embodiments, a clock signal coupled to post-blend FIFO 404, or other functional units within clock domain 407 (not shown) may be gated.

Once clock gating for clock domain 407 is enabled, the method may then depend on if the amount of data stored in output FIFO 405 is less than another ungate threshold value (block 609). As with the another gate threshold, the another ungate threshold value may be a predetermined value, or, in various embodiments, be programmable. If the amount of data stored in output FIFO 405 is greater than or equal to the another ungate threshold, then the method may proceed from block 608 as described above.

If the amount of data stored in output FIFO 405 is, however, less than the another ungate threshold, then clock gating for clock domain 407 may be disabled (block 610). In various embodiments, the clock signal coupled to post-blend FIFO 404 and any other functional units within clock domain 407 may be ungated. Once clock gating has been disabled for clock domain 407, then the method may proceed from block 606 as described above.

Although the operations of the method illustrated in FIG. 6 are depicted as being performed in a serial fashion, in other embodiments, one or more of the operations may be performed in parallel.

Figure 7:
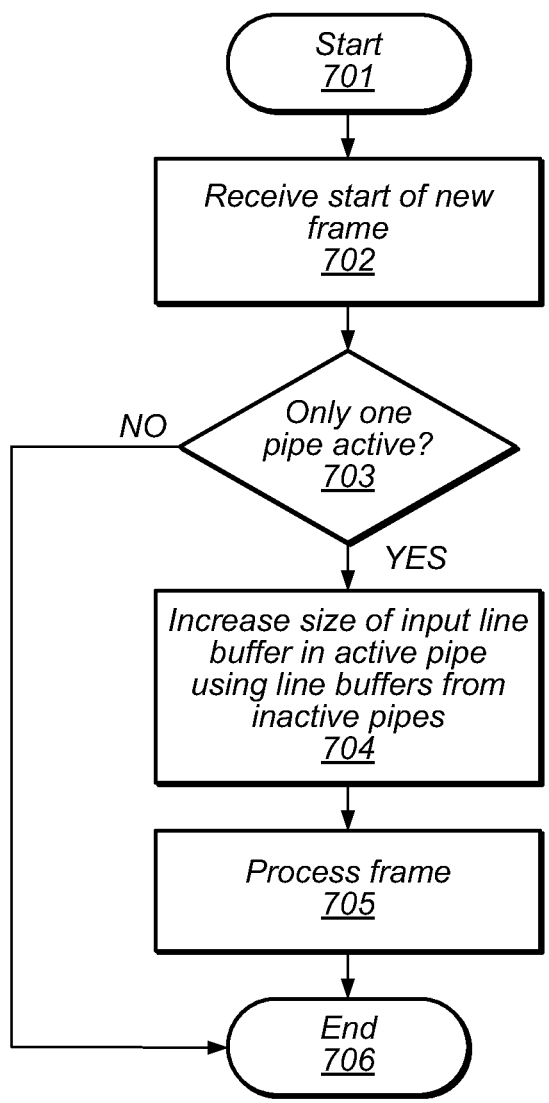
FIG. 7 illustrates a flow diagram depicting an embodiment of another method for operating a display processor.

Turning to FIG. 7, a flow diagram depicting a method for operating a display processor, such as, e.g., display processor 200, is illustrated. The method begins in block 701. Pixel data for a new frame may then be received (block 702). In various embodiments, the display processor may send a request for data via a communication bus, such as, bus 220, for example. In response to the request, a memory, such as, e.g., memory 120, may send the pixel data to the display processor via the same communication bus.

The method may then depend on a number of generic pipelines (also referred to herein as "processing pipelines") are to be employed to process the newly received frame data (block 703). When more than one generic pipeline is to be employed to process the received frame data, the method may conclude in block 706.

If, however, a single generic pipeline is to be employed to process the received frame data, then a size of a line buffer of the active generic pipeline may be increased (block 704). In some embodiments, a multiplex circuit, such as, e.g., multiplex circuit 312, may be employed to allow a line buffer (e.g., line buffer 304) of an inactive generic pipeline to receive information from a source outside the generic pipeline (e.g., input data 309). For example, line buffer 250 of generic pipe 201b as illustrated in FIG. 2, may receive data from a structured noise unit, or other suitable functional unit within generic pipe 201a. Data stored in line buffer 250 of generic pipe 201b may then be routed back to a line buffer within generic pipe 201a. By establishing the connection between the line buffers, an effective size, i.e., capacity to store data bits, of the line buffer of generic pipe 201a may be increase by the size of line buffer 250 of generic pipe 201b. In some embodiments, a line buffer with an increased storage capacity may allow for the storage of more than one of a frame, thereby reducing a number of fetches that may be performed by a given generic pipeline.

It is noted that the use of input buffers from inactive generic pipelines may also depend on a mode of operation of the active generic pipeline. For example, in some embodiments, increasing the size of the input buffer of the active generic pipeline may be in response to the active generic pipeline operating in a mode where scaling is not being performed (also referred to herein as a "no-scale mode").

Once the size of the line buffer of the active generic pipeline has been increase, the received frame data may be processed (block 705). In some embodiments, processing the frame data may include color space conversion, gamut adjust, and the like. The method may then conclude in block 706. Changes to line buffer sizes may, in various embodiments, be reset at the end of processing data for a given frame, thereby allowing an inactive generic pipeline to be employed to process frame data for a subsequent frame.

It is noted that embodiment depicted in FIG. 7 is merely an example. In other embodiments, different operations and different orders of operations are possible and contemplated.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of processing pipelines, wherein each processing pipeline of the plurality of processing pipelines is configured to:
     receive pixel data; and
     process the pixel data to generate formatted data;
   a functional unit configured to:
     receive formatted data from each processing pipeline of the plurality of pipelines; and
     combine the formatted data to generate display data;
   a memory configured to store the display data;
   wherein a first processing pipeline of the plurality of processing pipelines includes one or more buffers, wherein a first buffer of the one or more buffers is configured to:
     receive and store the display data from the functional unit in response to a determination that the first processing pipeline is inactive; and
     send the stored display data to the memory; and
   circuitry configured to disable a first clock signal coupled to at least one of the plurality of processing pipelines in response to a determination that an amount of data stored in the first buffer is greater than or equal to a first buffer threshold value and that an amount of data stored in the memory is greater than or equal to a first memory threshold value.

2. The apparatus of claim 1, wherein the circuitry is further configured to enable a second clock signal coupled to the first buffer in response to a determination that the amount of data stored in the memory is less than a second memory threshold value.

3. The apparatus of claim 1, wherein the circuitry is further configured to enable the first clock signal in response to a determination that the data amount of data stored in first buffer is less than a second buffer threshold value.

4. The apparatus of claim 3, wherein each processing pipeline of the plurality of processing pipelines includes one or more functional sub-units, and wherein the first processing pipeline includes a multiplex circuit configured to selectively couple an output of a first functional sub-unit of the first processing pipeline or the display data to an input of the first buffer.

5. The apparatus of claim 1, further comprising a multiplex circuit configured to selectively couple the display data or an output from the first buffer to the memory.

6. A method, comprising:
   receiving pixel data;
   processing the pixel data by a plurality of processing pipelines, wherein each processing pipeline generates a respective one of a plurality of formatted data;
   combining each one of the plurality of formatted data to generate display data;
   storing the display data in a buffer of a first processing pipeline of the plurality of processing pipelines in response to a determination that the first processing pipeline is inactive;
   sending the stored display data to a memory; and
   disabling a first clock signal coupled to at least one of the plurality of processing pipelines in response to determining an amount of data stored in the buffer is greater than or equal to a first buffer threshold value and that an amount of data stored in the memory is greater than or equal to a first memory threshold value.

7. The method of claim 6, further comprising enabling a second clock signal coupled to the buffer in response to a determination that the amount of data stored in the memory is less than a second memory threshold value.

8. The method of claim 6, further comprising enabling the first clock signal in response to determining the amount of data stored in the buffer is less than a second buffer threshold value.

9. The method of claim 8, wherein each processing pipeline of the plurality of processing pipelines includes one or more functional units, and wherein storing the display data in a buffer of a first processing pipeline of the plurality of processing pipelines comprises coupling an output of a first functional unit of the first processing pipeline or the display data to an input of the buffer by a multiplex circuit.

10. The method of claim 6, wherein sending the stored display data to the memory comprises coupling the display data or an output from the buffer to the memory by a multiplex circuit.

11. The method of claim 6, further comprising enabling a second clock signal coupled to the buffer in response to a determination that the amount of data stored in the memory is less than a second memory threshold value, wherein each of the first buffer threshold value, the first memory threshold value, and the second memory threshold value is programmable.

12. A system, comprising:
a first memory configured to store pixel data; and
a processing unit including a plurality of processing pipelines, and at least one functional unit, wherein each processing pipeline is configured to receive at least a portion of the stored pixel data, and process the portion of the stored pixel data to generate formatted data, and wherein the functional unit is configured to receive formatted data from each processing pipeline and combine the formatted data to generate display data; and
a second memory;
wherein a first processing pipeline of the plurality of processing pipelines includes one or more buffers, wherein a first buffer of the one or more buffers is configured to:
store the display received from the functional unit in response to a determination that the first processing pipeline is inactive; and
send the stored data to the second memory; and
wherein the processing unit further includes circuitry configured to disable a first clock signal coupled to at least one of the plurality of processing pipelines in response to a determination an amount of data stored in the first buffer is greater than or equal to a first buffer threshold value and that an amount of data stored in the second memory is greater than or equal to a first memory threshold value.

13. The system of claim 12, wherein the circuitry is further configured to enable a second clock signal coupled to the first buffer in response to a determination that the amount of data stored in the second memory is less than a second memory threshold value.

14. The system of claim 12, wherein the circuitry is further configured to enable the first clock signal in response to a determination that the amount of data stored in the first buffer is less than a second buffer threshold value.

15. The system of claim 14, wherein each processing pipeline of the plurality of processing pipelines includes one or more functional sub-units, and wherein the first processing pipeline includes a multiplex circuit configured to selectively couple an output of a first functional sub-unit of the first processing pipeline or the display data to an input of the first buffer.

16. The system of claim 12, wherein the processing unit further includes a multiplex circuit configured to selectively couple the display data or an output from the first buffer to the second memory.

17. The system of claim 12, wherein the circuitry is further configured to enable a second clock signal coupled to the first buffer in response to a determination that the amount of data stored in the second memory is less than a second memory threshold value wherein each of the first buffer threshold value, the first memory threshold value, and the second memory threshold value is programmable.

* * * * *